Patented Nov. 6, 1934

1,979,505

UNITED STATES PATENT OFFICE 1,979,505

COLORING

Sidney Thornley, Grangemouth, Scotland, and Alfred Yeoman Twemlow, Moston, Manchester, England, assignors to Imperial Chemical Industries Limited, a corporation of Great Britain No Drawing. Application April 22, 1931, Serial No. 532,116. In Great Britain April 28, 1930

17 Claims. (Cl. 8—5)

This invention relates to the art of dyeing, and more particularly to the coloring of esters and ethers of cellulose.

This invention has for an object the production of new dyeing and coloring processes, the production of dyed materials of superior qualities and in general an advancement of the art. Other objects will appear hereinafter.

These objects are accomplished by treating cellulose esters or ethers with a compound having the probable formula

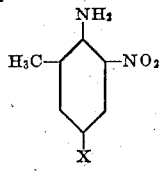

wherein X represents an alkyl radical or a halogen atom.

The invention will be further understood from a consideration of the following examples.

I

One (1) kilogram of acetate silk (cellulose acetate) was dyed in a dyebath of about 35 liters containing 20 grams of 5-nitro-4-amino-m-xylene in a finely subdivided form, for about 1 hour at a temperature between 70° and 75°, a small quantity of Turkey-red oil being added. As a result the silk was dyed a beautiful greenish yellow shade which was very fast to light and which could be discharged to leave a good white. The dyeings are pronouncedly resistant to loss by sublimation of the dyestuff and do not suffer appreciably from the defect of marking off on adjacent white goods.

II

The process of Example I was carried out using 5-chloro-3-nitro-o-toluidine in place of 5-nitro-4-amino-m-xylene. Dyeings having similar properties but of a somewhat redder shade were obtained.

Especially good results are obtained with compounds of the general formula wherein X represents a methyl group or a chlorine group.

The cellulose esters or ethers can be dyed with the said compounds from a colloidal solution or from an aqueous suspension or solution, with or without the addition of a protective colloid, a salt, an acid, or an alkali.

It has been found that the substances represented by the general formula set out above, for example, 5-nitro-m-4-xylidine and 5-chloro-3-nitro-ortho-toluidine are surprisingly differentiated from other nitro aryl amines in that the dyeings obtained from them according to this invention are non-phototropic. Further cellulose ester or ether materials may be dyed with them without the objectionable blinding or delustering effect commonly obseved with the nitro-arylamines.

It has been found that cellulose ethers and esters for instance, acetate silk, are dyed in fast yellow shades by the application thereto of compounds having the general formula set out above.

As many apparently widely different embodiments of this invention may be made without departing from the spirit and scope thereof, it is to be understood that we do not limit ourselves to the specific embodiments thereof except as defined in the appended claims.

We claim:

1. A dye composition comprising the compound having the probable formula

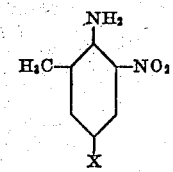

wherein X represents an alkyl radical or a halogen atom, and Turkey red oil.

2. A dye composition comprising the compound having the probable formula

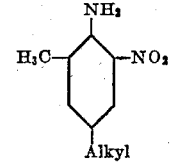

and Turkey red oil.

3. A dye composition comprising the compound having the probable formula

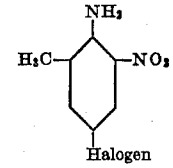

and Turkey red oil.

4. A process for the production of fast, non-phototropic, yellow shades on cellulose ester or ether materials which comprises treating the material with a 3-nitro-o-toluidine (CH₃:NH₂:NO₂=1:2:3)

carrying in the 5-position a methyl group or a halogen atom.

5. The process which comprises dyeing cellulose esters or ethers with a compound having the probable formula

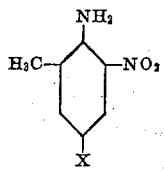

wherein X represents an alkyl radical or a halogen atom.

6. The process which comprises dyeing cellulose esters or ethers with a compound having the probable formula

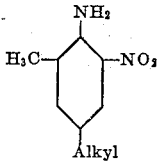

7. The process which comprises dyeing cellulose esters or ethers with a compound having the probable formula

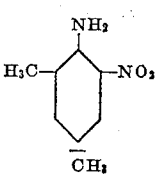

8. The process which comprises dyeing cellulose esters or ethers with a compound having the probable formula

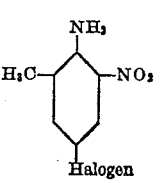

9. The process which comprises dyeing cellulose esters or ethers with a compound having the probable formula

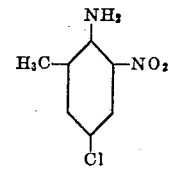

10. Process according to claim 4 in which the material is treated with 5-nitro-m-4-xylidine or 5-chloro-3-nitro-o-toluidine.

11. The process which comprises dyeing cellulose acetate with a colloidal solution of a compound of the probable formula

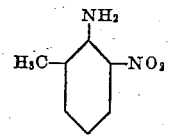

which has a substituent from the group consisting of halogen and alkyl in the position para to the amino group.

12. The process of claim 6 in which the cellulose ester is cellulose acetate.

13. The process of claim 7 in which the cellulose ester is cellulose acetate.

14. The process of claim 8 in which the cellulose ester is cellulose acetate.

15. The process of claim 9 in which the cellulose ester is cellulose acetate.

16. A dye composition for application to cellulose esters and ethers comprising a 3-nitro-o-toluidine (CH₃:NH₂:NO₂=1:2:3) having in the 5 position an alkyl radical together with a dispersing agent.

17. A dye composition for application to cellulose esters and ethers comprising a 3-nitro-o-toluidine (CH₃:NH₂:NO₂=1:2:3) having in the 5 position a halogen atom radical together with a dispersing agent.

SIDNEY THORNLEY.
ALFRED YEOMAN TWEMLOW.